United States Patent [19]

Walther et al.

[11] Patent Number: 5,574,091
[45] Date of Patent: Nov. 12, 1996

[54] AQUEOUS DISPERSIONS OF OLEFIN COPOLYMERS

[75] Inventors: Brian W. Walther; Jim R. Bethea, both of Baton Rouge, La.

[73] Assignee: The Dow Chemical Comapny, Midland, Mich.

[21] Appl. No.: 463,150

[22] Filed: Jun. 5, 1995

[51] Int. Cl.$^6$ .................................................. C08L 9/00
[52] U.S. Cl. ......................... 524/570; 524/158; 524/579
[58] Field of Search .................................... 524/570, 158, 524/579

[56] References Cited

U.S. PATENT DOCUMENTS

| | | | |
|---|---|---|---|
| 3,360,599 | 12/1967 | Nyberg et al. | 264/216 |
| 3,418,265 | 12/1968 | McClain | 260/29.6 |
| 3,503,917 | 3/1970 | Burke, Jr. | 260/29.6 |
| 3,645,992 | 2/1972 | Elston | 260/80.78 |
| 3,734,686 | 5/1973 | Douglas | 8/137 |
| 4,123,403 | 10/1978 | Warner et al. | 260/29.2 |
| 5,037,864 | 8/1991 | Anand et al. | 523/348 |
| 5,272,236 | 12/1993 | Lai et al. | 526/348.5 |
| 5,278,272 | 1/1994 | Lai et al. | 526/348.5 |

FOREIGN PATENT DOCUMENTS

WO94/18263  8/1994  WIPO.

*Primary Examiner*—Peter D. Mulcahy
*Attorney, Agent, or Firm*—Reid S. Willis

[57] ABSTRACT

Artificial latexes that are film-forming at room temperature can be prepared from a copolymer of ethylene and a $C_3$–$C_{20}$ alpha olefin. The copolymer preferably contains no polar substituents, which are generally necessary to make useful latexes from polyethylene.

6 Claims, No Drawings

AQUEOUS DISPERSIONS OF OLEFIN COPOLYMERS

BACKGROUND OF THE INVENTION

This invention relates to an aqueous dispersion of an olefin copolymer. These dispersions may be film-forming at room temperature and can have excellent physical and mechanical properties.

Aqueous dispersions of polyolefins are known in the art, although none are reported to have been derived from polyolefins having molecular weights above 40,000. For example, in U.S. Pat. No. 3,734,686, incorporated herein by reference, Douglas et al., discloses a mechanically stable aqueous emulsion of polyethylene particles having an average molecular weight ranging from about 7,000 to 40,000. These dispersions are taught to be useful for treating carpets.

In U.S. Pat. No. 3,418,265, McClain teaches that aqueous film-forming ethylene polymer latexes containing ethylene polymer particles of submicron size can be prepared by dispersing in water an ethylene polymer and a water-soluble block copolymer of ethylene oxide and propylene oxide. No examples of stable dispersions of ethylene polymers having a molecular weight above 27,000 are reported.

Many of the polyolefin latexes previously described are actually not purely polyolefinic, but rather contain polar groups, such as acids or halides. Since the film-forming properties of these so-called polyolefin latexes are often adversely influenced by the presence of these polar substituents, it would be desirable to prepare latexes derived from higher molecular weight polyethylenes that did not contain polar groups. It would be of further value if these latexes were film-forming at room temperatures.

SUMMARY OF THE INVENTION

The present invention is a film-forming, aqueous dispersion comprising an olefin polymer that is a copolymer of ethylene and a $C_3$–$C_{20}$ alpha-olefin, the olefin polymer being further characterized by an absence of polar groups.

In another aspect, the present invention is a film-forming, aqueous dispersion comprising a copolymer of ethylene and a $C_3$–$C_{20}$ alpha-olefin having:
a) about 0.01 to about 3 long chain branches per 1000 carbon atoms along the polymer backbone;
b) a polydispersity index of less than about 3.5;
c) a melt flow ratio that is i) at least 5.63, and ii) essentially independent of the polydispersity index; and
d) a critical shear stress rate at onset of gross melt fracture of greater than about $4 \times 10^6$ dyne/cm$^2$ In another aspect, the present invention is a film-forming, aqueous dispersion comprising a copolymer of ethylene and a $C_3$–$C_{20}$ alpha-olefin having:
a) about 0.01 to about 3 long chain branches per 1000 carbon atoms along the polymer backbone;
b) a polydispersity index of less than about 3.5;
c) a melt flow index that is essentially independent of the polydispersity ratio; and
d) a critical shear rate at onset of surface melt fracture of at least 50 percent greater than the critical shear rate at the onset of surface melt fracture of a linear olefin polymer having about the same $I_2$ and $M_w/M_n$.

In yet another aspect, the present invention is a film-forming, aqueous dispersion comprising a copolymer of ethylene and a $C_3$–$C_{20}$ alpha-olefin having a narrow molecular weight distribution, a random distribution of comonomer units along the polymer backbone, and a homogeneity index of at least 75.

It has surprisingly been discovered that film-forming latexes can be prepared from these olefin polymers in the absence of polar substituents.

DETAILED DESCRIPTION OF THE INVENTION

The olefin polymer used to prepare the aqueous dispersion of the present invention is from a family of olefin polymers, which are described in U.S. Pat. Nos. 3,645,992, 5,272,236, and 5,278,272 all incorporated herein by reference. The class of olefin polymers described in U.S. Pat. No. 3,645,992, hereinafter referred to as the Elston olefin polymer, is characterized by being a copolymer of ethylene and at least one other alpha-olefin having four or more carbon atoms, such as 1-butene, 1-hexene, 1-octene, and 1-octadecene. Interpolymers, such as ethylene-octenebutene or ethylene-octene-propylene are also suitable for the preparation of the aqueous dispersions of the present invention. The Elston olefin polymer is further characterized by a narrow molecular weight distribution and a homogeneity index of at least 75 as described in the '992 patent.

The olefin polymers described in U.S. Pat. Nos. 5,272,236 and 5,278,272 (collectively referred to as substantially linear olefin polymers) are ethylene-$C_3$–$C_{20}$ alpha-olefin copolymers characterized by having 1) high melt elasticity; 2) high processability; 3) a polydispersity index of less than about 3.5; 4) about 0.01 to about 3 long chain branches per 1000 carbon atoms along the polymer backbone; and 5) a melt flow ratio that is essentially independent of the polydispersity index. The olefin polymer of the '236 patent is further characterized as having a critical shear stress rate at onset of gross melt fracture of greater than about $4 \times 10^6$ dyne/cm$^2$; and the olefin polymer of the '272 patent is further characterized by having a critical shear rate at onset of surface melt fracture of at least 50 percent greater than the critical shear rate at the onset of surface melt fracture of a linear olefin polymer having about the same $I_2$ and $M_w/M_n$.

The substantially linear olefin polymers from which the aqueous dispersions are prepared can be homopolymers of $C_2$–$C_{20}$ olefins, such as ethylene, propylene, 4-methyl-1-pentene, etc., or they can be interpolymers of ethylene and at least one $C_3$–$C_{20}$ alpha-olefin, and/or a $C_2$–$C_{20}$ acetylenically unsaturated monomer and/or a $C_4$–$C_{18}$ diolefin. Preferred monomers include $C_2$–$C_{10}$ alpha-olefins, especially ethylene, propylene, isobutylene, 1-butene, 1-hexene, 4-methyl-1-pentene, and 1-octene. Other preferred monomers include styrene and 1,4-hexadiene.

The substantially linear olefin polymers have about 0.01, preferably about 0.3, to about 3, and preferably 1 long chain branches per 1000 carbon atoms along the polymer backbone. Long chain branching is defined herein as a chain length of at least about 6 carbon atoms, above which the length cannot be distinguished by carbon NMR spectroscopy. The long chain branch can be about as long as the polymer backbone.

The polydispersity index of the substantially linear olefin polymers (i.e., the molecular weight distribution, or the ratio weight average molecular weight to the number average molecular weight ($M_w/M_n$)), is preferably from about 1.5 to about 2.5. The melt flow ratio (i.e., the $I_{10}/I_2$) of the substantially linear olefin polymers is at least 5.63, preferably at least 6, more preferably at least 7, and is essentially independent of the polydispersity index, in contrast to conventional polyolefins which show a dependence of the melt flow index on the polydispersity index. This property is illustrated in FIG. 2 of the '236 patent.

The preparation of the substantially linear olefin polymers is described in detail in the '236 patent.

The density of the olefin polymer disclosed in the '272 patent is preferably from about 0.85 g/cm³, more preferably from about 0.86 g/cm³, to about 0.90 g/cm³, more preferably to about 0.88 g/cm³.

The weight average molecular weight of the substantially linear olefin polymers used to prepare the aqueous dispersion is preferably at least about 45,000 amu, more preferably at least about 60,000 amu. The molecular weights are measured as described in U.S. Pat. No. 5,278,272, col. 5, line 56 to col. 6, line 20. The olefin preferably contains no polar groups, such as acetate, ester, ether, amine, alcohol, acrylic, methacrylic, halogen, nitrile, nitro, sulfate, phosphate, or mercaptan groups; and there is preferably no post-modification step to add polar groups.

The latexes of the substantially linear olefin polymers are prepared in the presence of a stabilizing and an emulsifying amount of a suitable surfactant. A preferred surfactant is a sulfate of an ethoxylated phenol represented by the formula:

$$X\text{-}\Phi\text{-}O\text{-}(CH_2\text{-}CH_2\text{-}O)_n\text{-}SO_3^-Z^+$$

wherein X is a $C_6$–$C_{18}$ linear or branched alkyl group, preferably octyl, nonyl, or lauryl, more preferably octyl or nonyl, most preferably nonyl; $\Phi$ is phenylene, preferably p-phenylene; n is from 4 to 32, preferably from 4 to 12; and Z is sodium, potassium, or ammonium, preferably ammonium. Some of the preferred sulfates of ethoxylated alkylphenols are commercially available, for example, poly(oxy-1,2-ethanediyl)alpha-sulfo-ω(nonylphenoxy) ammonium salt.

Aqueous dispersions of the substantially linear olefin polymers can be prepared by any suitable technique, including those described in U.S. Pat. Nos. 3,360,599; 3,503,917; 4,123,403; and 5,037,864 all incorporated herein by reference. It has surprisingly been discovered that a film having a substantially uniform thickness across a substrate or form can be prepared from the aqueous dispersion described hereinabove. The film is further characterized by an absence of cracking or foramina. Finally, the film has useful physical properties, such as a high tensile strength, and can be formed at room temperature, and in the absence of polar substituents.

The film can be prepared by any suitable means such as casting, coagulating, or spraying. If films are prepared by coagulation, it is generally preferred to use fatty acid based surfactants, such as the sodium salt of oleic acid.

The following example is for illustrative purposes only and is not intended to limit the scope of the invention.

EXAMPLE 1

A Cast Film of an Ethylene-1-Octene Latex

An artificial latex is prepared from ENGAGE™ CL 8002 ethylene-octene elastomer (Trademark of The Dow Chemical Company), which has a melt index of 1, a density of 0.87 g/cm³, an $I_{10}/I_2$ of 7.8, a weight average molecular weight of 129,800, and a $M_w/M_n$ of 2.2. To a 2-liter reactor vessel is added 612 g of the ethylene-octene copolymer solution containing 61 g of the copolymer in 551 g of cyclohexane; 3.06 g of Rhodapex™ CO 436 surfactant (Trademark of Rhone Poulenc); and 288 g of water. These ingredients are emulsified using a Gifford-Woods homogenizer by mixing at nominally 10,000 rpm for 10 minutes. About 0.2 g of DF37 defoamer (obtained from Air Products) is added to reduce the foam. The cyclohexane solvent is removed from the emulsion by rotary evaporation at 80° C. The resulting artificial latex is concentrated to about 30 percent solids by applying a partial vacuum to the latex with continued heating.

The particle size of the latex, which is analyzed using a Coulter Counter Multisizer IIe, is found to be 0.9 microns, with 74% of the particles being less than 1.25 microns.

About 20 mL of the latex is poured on a clean glass substrate, and spread uniformly using a draw bar. The latex is allowed to air dry at room temperature. As the latex dries, a coherent film is formed. The film, still on the substrate, is annealed at 60° C. for 5 minutes to drive off any remaining water, then allowed to cool to room temperature. The resultant film has a tensile strength of 1600 psi, 100 percent modulus of 270 psi, and a percent elongation of 1270 percent.

EXAMPLE 2

A Cast Film of an Ethylene-1-Octene Latex

An artificial latex is prepared as described in Example 1 from an ethylene-octene copolymer having a melt index of 11, a density of 0.887 g/cm³, an $I_{10}/I_2$ of 7.8, a weight average molecular weight of 60,000, and an ethylene/octene ratio of 2.1:1, and prepared according to the teachings of the '272 patent. The resultant film has a tensile strength of 2200 psi, 100 percent modulus of 460 psi, and a percent elongation of 1300 percent.

What is claimed is:

1. A film-forming, artificial latex comprising an aqueous dispersion of a copolymer of ethylene and a $C_3$–$C_{20}$ alpha-olefin, the olefin polymer being characterized by having:

a) an absence of polar groups;

b) a polydispersity index from about 1.5 to about 2.5;

c) an $I_{10}/I_2$ of at least 6;

d) a critical shear rate at onset of surface melt fracture of at least 50 percent greater than the critical shear rate at the onset of surface melt fracture of a linear olefin polymer having the same $I_2$ and polydispersity index;

e) a weight average molecular weight of at least 45,000; and f) a density of about 0.85 to about 0.9 g/cm³.

2. The film-forming, artificial latex of claim 1 wherein the copolymer has a density of about 0.86 to about 0.88.

3. The film-forming, artificial latex of claim 1 wherein the copolymer is an ethylene-1-octene, ethylene-1-butene, ethylene-1-hexene, or ethylene-4-methyl-1-pentene copolymer.

4. The film-forming, artificial latex of claim 1 wherein the copolymer is an ethylene-1-octene copolymer.

5. The film-forming, artificial latex of claim 1 wherein the dispersion is stabilized with a sulfate of an ethoxylated phenol represented by the formula:

$$X\text{-}\Phi\text{-}O\text{-}(CH_2\text{-}CH_2\text{-}O)_n\text{-}SO_3^-Z^+$$

wherein X is a $C_6$–$C_{18}$ linear or branched alkyl group; $\Phi$ is phenylene; n is from 4 to 32; and Z is sodium, potassium, or ammonium.

6. The film-forming, artificial latex of claim 1 that is film-forming at room temperature.

\* \* \* \* \*

UNITED STATES PATENT AND TRADEMARK OFFICE
CERTIFICATE OF CORRECTION

PATENT NO. : 5,574,091
DATED : November 12, 1996
INVENTOR(S) : Brian W. Walther; Jim R. Bethea It is certified that error appears in the above-identified patent and that said Letters Patent is hereby corrected as shown below:

Claim 4, column 4, line 52 "1" should correctly read - - 3 - -

Signed and Sealed this

Nineteenth Day of January, 1999

Attest:

Attesting Officer

*Acting Commissioner of Patents and Trademarks*